(12) United States Patent
Smushkovich et al.

(10) Patent No.: US 8,065,759 B2
(45) Date of Patent: Nov. 29, 2011

(54) MCCLAIN'S BATHTUB MONITOR (75) Inventors: Aleksandr Smushkovich, Brooklyn, NY (US); Eugene Pogrebinsky, San Diego, CA (US)

(73) Assignee: Robert McClain, Ellenwood, GA (US)

( * ) Notice: Subject to any disclaimer, the term of this patent is extended or adjusted under 35 U.S.C. 154(b) by 1279 days.

(21) Appl. No.: 11/693,174

(22) Filed: Mar. 29, 2007

(65) Prior Publication Data
US 2008/0235865 A1  Oct. 2, 2008

(51) Int. Cl.
  *E03C 1/00*  (2006.01)
  *E03C 1/042*  (2006.01)
  *F16K 31/00*  (2006.01)
  *F16K 21/18*  (2006.01)
  *G05D 9/12*  (2006.01)

(52) U.S. Cl. ............. 4/669; 4/668; 4/679; 4/695; 4/427; 137/392; 137/395; 137/398

(58) Field of Classification Search ............. 4/668, 669, 4/679, 680, 694, 695, 427; 137/392, 393, 137/395, 398
See application file for complete search history.

(56) References Cited

U.S. PATENT DOCUMENTS

| 4,563,780 | A  | * | 1/1986  | Pollack ........................... 4/668 |
| 4,607,658 | A  | * | 8/1986  | Fraser et al. ................. 137/393 |
| 5,588,471 | A  | * | 12/1996 | Lowe ............................... 141/83 |
| 5,975,124 | A  | * | 11/1999 | Stevens, II .................... 137/392 |
| 6,732,388 | B2 | * | 5/2004  | McKenna ........................ 4/669 |
| 6,810,902 | B2 | * | 11/2004 | Bootka ........................ 137/312 |
| 7,350,245 | B2 | * | 4/2008  | Giagni ............................ 4/668 |
| 2005/0251906 | A1 | * | 11/2005 | Scott et al. ...................... 4/668 |

* cited by examiner

*Primary Examiner* — Jason J Boeckmann
*Assistant Examiner* — Ryan Reis
(74) *Attorney, Agent, or Firm* — Aleksandr Smushkovich (57) ABSTRACT

A monitor embodiment, monitoring overflow levels in a bathtub, comprises an input water unit, including a control circuitry, coupled to a hot-cold water facet; a water level detection unit including telescopically joined tubes with a floatable lowest tube associated with an indicator, an uppermost tube fixed to the input unit, sensors attached to non-lowest tubes variably coupled. The sensors detect the indicator's position reaching a predetermined alarm or shutoff level, causing respective initiating an alarm signal, or terminating the input unit's water flow. Another embodiment additionally comprises an output water unit associated with the circuitry, incorporating a temperature sensor and a user preset-temperature selector. The output unit outlets cooled water from the bathtub, the input unit inlets hot water until the preset-temperature is reached, provided no alarm signal was issued. An additional sensor, incorporated in the input unit, allows adding the hot water when it's hotter than the bathtub water.

7 Claims, 9 Drawing Sheets

MCCLAIN'S BATHTUB MONITOR

TECHNICAL FIELD

The present invention relates to plumbing systems, particularly, but not exclusively to bathtub water level and temperature monitor/alarm systems.

BACKGROUND OF THE INVENTION

Prior art describes a numerous types of devices for control of overflow levels in bath tubs and for alarming a user of bathtub overflowing. There are also a lot of devices intended to monitor the bathtub water temperature at the user's desire.

One of such devices is disclosed in a U.S. Pat. No. 6,956,486 to Robert L. King, Jr., as follows: "A bathtub water level monitoring system for alerting a user upon acquisition of a pre-selected level in a bathtub. The bathtub water level monitoring system includes a bathtub, a main unit adapted for attachment to an interior face of a bathtub, the main unit having a plurality of water sensors aligned along a lower portion of the main unit. The main unit further includes a transmitter and alarm system for producing an audible alarm upon the water sensor detecting a predetermined water level. The system includes a remote alarm device for giving an audible alarm upon reception of a signal transmitted from the transmitter of the main unit." The device of that patent is substantially installed inside the tub, which is often inconvenient to users. It does not provide for a means to shut off the incoming water flow, in case the user does not hear the alarm sound, e.g. when she left the house and forgot about the bath.

Another device is exemplified in a U.S. Pat. No. 7,096,522 to R. Eric Hirtriter, that comprises an alarm "adaptable to common American bathtub cover plate configurations." That invention chiefly deals with attachment arrangements of the device, which device is also substantially installed inside the tub. It does not provide for a means to shut off the incoming water flow, in case the user is not at home and forgets about the bath.

A U.S. Pat. No. 7,068,175 to Larry Pennington teaches: "A water level warning device for use in conjunction with a bathtub or a sink for audibly warning a user when the water flowing into the bathtub or sink has reached a predetermined level. The warning device comprises a cylindrical tube containing a floating ball and having a plurality of circular openings extending fully therethrough for allowing water from the bathtub or sink to enter the tube. The top of the tube has a pressure activated sensor and a speaker in communication with the sensor. The height of the tube may be telescopically adjusted by the user . . . the floating ball floats upon the upper surface of the water entering the tube, and activates the sensor when the level of water reaches the top of the tube. Upon selective activation of the sensor, the speaker emits an audible alarm." In detail, it explains: "The circular bottom 12B of the tube 12 has a suction cup 18 attached thereunto, for firmly anchoring the warning device 10 to the base of the bathtub." Similarly to those described in the aforementioned patents, that device is intended for installation inside the tub to be attached to its bottom. It does not provide for a means to shut off the incoming water flow, when the user does not hear the warning sound of the speaker.

Another U.S. Pat. No. 6,732,388 to McKenna, entirely incorporated hereby by reference, describes "An overflow system suitable for use in controlling the level of water in, for example, a bathtub (3) is described. The overflow system comprises a conduit attached to the overflow outlet (21) of the bathtub (3) and is arranged so that when the bathtub (3) is overfilled, any excessive flow rate of overflow water through the conduit (19) is detected. The excessive flow rate is detected by arranging for the outlet (25) of the conduit to have a smaller maximum flow rate than the inlet (23) of the conduit so that water backs up within the conduit during an excessive flow rate condition. The backed up water may be detected by a reed switch (31) in conjunction with a magnetic float (27) in order to actuate a solenoid valve (9) to prevent any more water from entering the bathtub (3)." That invention contemplates substantial alterations to the existing plumbing arrangements for known bathtubs, and thus would entail significant additional expenses.

A published U.S. patent application 2005/0251906, entirely incorporated hereby by reference, teaches "A control system for filling a bathtub which automatically shuts off the bathtub faucet when the water has reached a desired level, by detecting a volume of water that has passed through the dispensing pipe or a level of water in the bathtub. In the preferred embodiment a timer is provided to automatically shut off the bathtub faucet after a preset time interval, as a backup or as an independent filling regulator. In one embodiment a temperature sensor or timer is provided to adjust the flow of hot water and cold water as necessary to maintain a constant temperature which has been set by the user. In another embodiment one or more timers are provided to control the flow of hot water and cold water separately as necessary to reach the desired temperature." The system, described in that patent application, is capable to additionally regulate the water temperature in the bathtub. That construction though requires certain alterations of the existing bath plumbing arrangements.

Liquid level switches, also known as reed-style switches, are mounted to the inside of a tank and are activated when the liquid content reaches the float. As the float rises and falls, a magnet attracts and releases the contacts, opening and closing the switch. Therefore, such a switch would need to be mounted to the interior of the bathtub that is not always acceptable to the users.

BRIEF SUMMARY OF THE INVENTION

The present invention is addressed to eliminate or substantially reduce the aforesaid drawbacks and shortcomings of prior art, and essentially allows for monitoring a desirable maximum level of water in a bathtub, warning the user when such level is about to be reached and shutting off the incoming water flow when the level has been reached, as well as monitoring a desirable temperature in the bathtub by regulating the incoming and drain water flows. The invention substantially requires no or very little changes to the existing plumbing arrangements.

The mentioned aims are achieved by providing a bathtub monitor, in one embodiment, monitoring overflow water levels in a bathtub, which comprises an input water unit, including a control circuitry, coupled to a hot-cold water faucet; a water level detection unit including telescopically joined tubes with a floatable lowest tube associated with an indicator, an uppermost tube fixed to the input unit, sensors attached to non-lowest tubes that can be variably coupled. The sensors detect the indicator's position reaching a predetermined alarm or shutoff level, causing respective initiating an alarm signal, or terminating the input unit's water flow. Another embodiment additionally comprises an output water unit associated with the circuitry, incorporating a temperature sensor and a user preset-temperature selector. The output unit outlets cooled water from the bathtub, the input unit inlets hot water until the preset-temperature is reached, provided no alarm signal was issued. An additional sensor, incorporated in the input unit, allows adding the hot water when it's hotter than the bathtub water.

BRIEF DESCRIPTION OF DRAWINGS

FIG. 2b illustrates an isometric view from the above of the output water unit shown on FIG. 2a.

Similar reference numerals on the drawings generally refer to the same or similar elements on different figures. A newly introduced numeral in the description is enclosed into parentheses.

PREFERRED EMBODIMENTS OF THE PRESENT INVENTION

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

First Preferred Embodiment: Description and Operation

Figure 1:
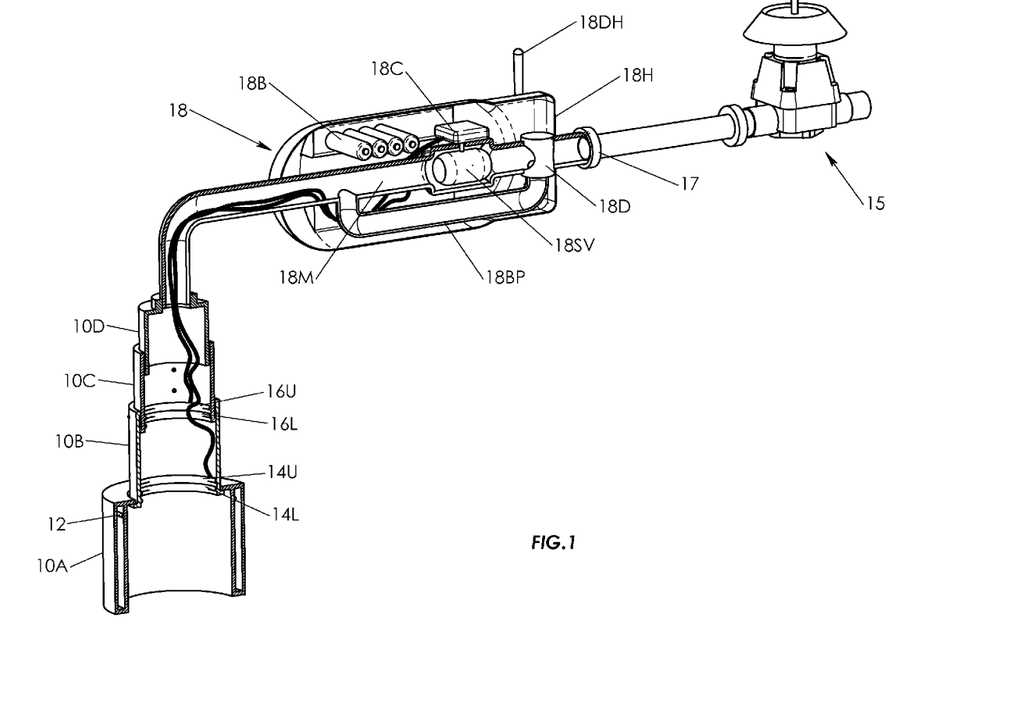
FIG. 1 illustrates a sectional isometric view of an embodiment of the inventive device including an input water unit.
Figure 1A:
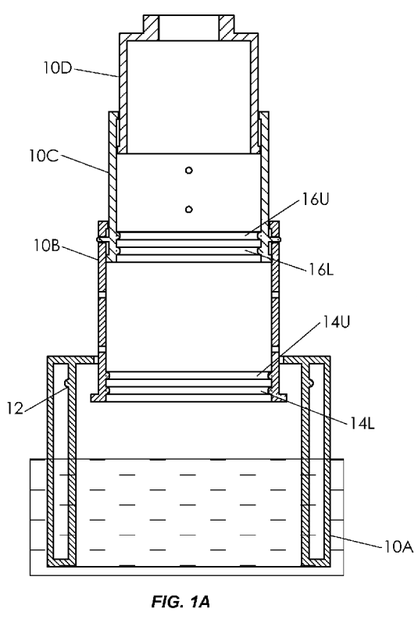
FIG. 1a illustrates a partial sectional view of the embodiment shown on FIG. 1 indicating an alarm level position of the device.
Figure 1B:
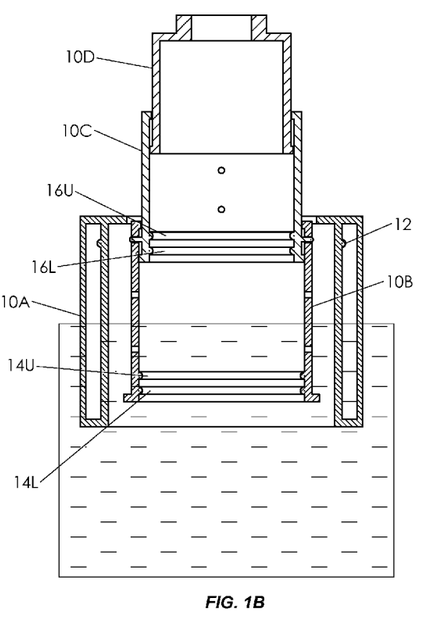
FIG. 1b illustrates a partial sectional view of the embodiment shown on FIG. 1 indicating a shutoff level position of the device.
Figure 1C:
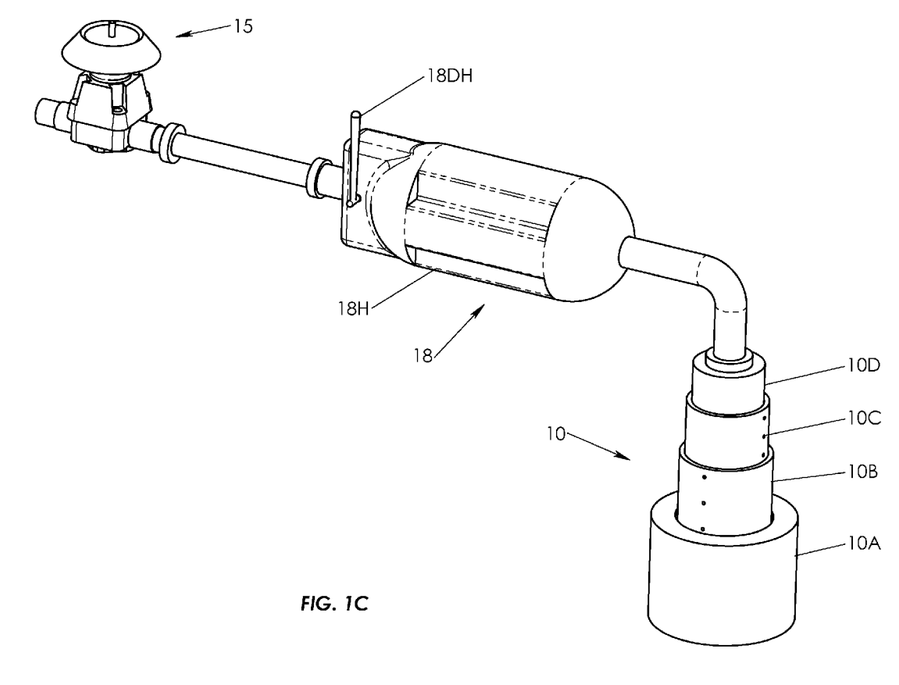
FIG. 1c illustrates an isometric view of the embodiment shown on FIG. 1.

A first exemplary preferred embodiment of the present invention is illustrated on FIG. 1 and FIG. 1c. The inventive bathtub monitor comprises an input water unit (18) capable to be attached to an existing bath faucet (15), typically mounted on a bathroom wall. In this disclosure the faucet 15 is considered to be a conventional faucet mixing hot and cold water supplied from the respective conventional supply water systems. Other embodiments may include a pair of separate hot faucet and cold faucet, so that slight design alterations may be required for such embodiments.

The unit 18 comprises a housing (18H) suitably shaped (preferably having an elongated shape with a circular or an ellipse-like cross-section) to enclose elements described herein below. The housing 18H is furnished with an adaptor (17) connecting it to the facet 15. The adaptor 17 may be designed similarly to conventional adaptors, e.g. used for attachment of home washer machines to faucets. There may be a series of such adaptors suitable for different spout diameters of commonly used bath faucets.

As reflected on FIG. 1, the input unit 18 comprises a diverter (18D), which serves for switching a monitoring mode of the unit 18 to a regular mode of the unit, that is bypassing the bathtub monitor and using the faucet 15 in a conventional way. In this embodiment, the diverter 18D is situated within the housing 18D, adjacently to the adaptor 17, and is furnished with a handle (18DH) for changing the aforementioned modes. For instance, the user changes the modes by turning the handle 18DH from a "Monitor On" position to a "Monitor Off" position (not shown). The diverter 18D has three ports: an inlet port communicated with the adaptor 17, a first outlet monitor port communicated with a monitor duct (18M) longitudinally disposed inside the housing 18H, and a second outlet bypass port communicated with a bypass duct (18BP) longitudinally disposed inside the housing 18H. The outlet ports communicate with a spout of unit 18, connected to the housing 18H, through which spout an incoming water flow exits the unit 18 and enters a bathtub (11).

The input unit 18 comprises a waterproof battery compartment (18B) with a number of batteries. The battery compartment 18B is removably installed in the housing 18H providing a possibility to change the batteries. Other embodiments may utilize a conventional 12V DC rectified voltage supplied from an isolating transformer, similar to the one described in the above-referenced U.S. Pat. No. 6,732,388. Some embodiments may include a LED (light emitting diod) indicator for the batteries, e.g. a green light—when the batteries are sufficiently charged, a yellow light—when additional charging required, and a red light—when the batteries are fully discharged. LED devices may also be included in the bathtub monitor for entertainment purposes.

The unit 18 comprises a valve (18SV), preferably of a solenoid type. The valve 18SV is communicated with its inlet port to the diverter 18D and with its outlet port the monitor duct 18M. The valve 18SV serves to regulatively open and shut the incoming water flow into the bathtub 11 in the monitor mode, following commands of control means discussed below.

The input unit 11 comprises a control circuitry (18C) encapsulated in a casing suitably mounted inside the housing 18H. The control circuitry 18C is electrically connected particularly to the batteries in the compartment 18B, and to the valve 18SV. The circuitry 18C is the main part of the monitor system's control means, and described in more detail herein further.

The bathtub monitor comprises a water level detecting unit (10). The detecting unit 10 includes a plurality (at least two) of telescopically connected tubes, preferably vertically positioned. In the embodiment illustrated on FIG. 1, there are four such tubes: an uppermost tube (10D) coupled to the spout of unit 18; an upper intermediate tube (10C) slidely attached to the tube 10D; a lower intermediate tube (10B) slidely attached to the tube 10C; a lowest floatable tube (10A) slidely attached to the tube 10B situated above. The tube 10A may have a number of orifices in its sidewalls (not shown) to outlet the air body inside the tube 10A to the outside. In this embodiment, the tube 10A made with the maximum diameter, greater than the diameter of tube 10B that is greater than the diameter of tube 10C that is greater than the diameter of tube 10D. Other embodiments may have the opposite relation of the tube diameters.

The lowest tube 10A is performed with double sidewalls, providing a predetermined space of air hermetically confined between the sidewalls. The predetermined space is so chosen that provides a sufficient buoyancy of the tube 10A while surrounded inside and outside by water. The tube 10A is so designed that its waterline may be preferably positioned below the half-height point when it is floating. This type of design allows constructing the floatable tube 10A with a minimal possible height, providing more convenience to the user.

Figure 3:
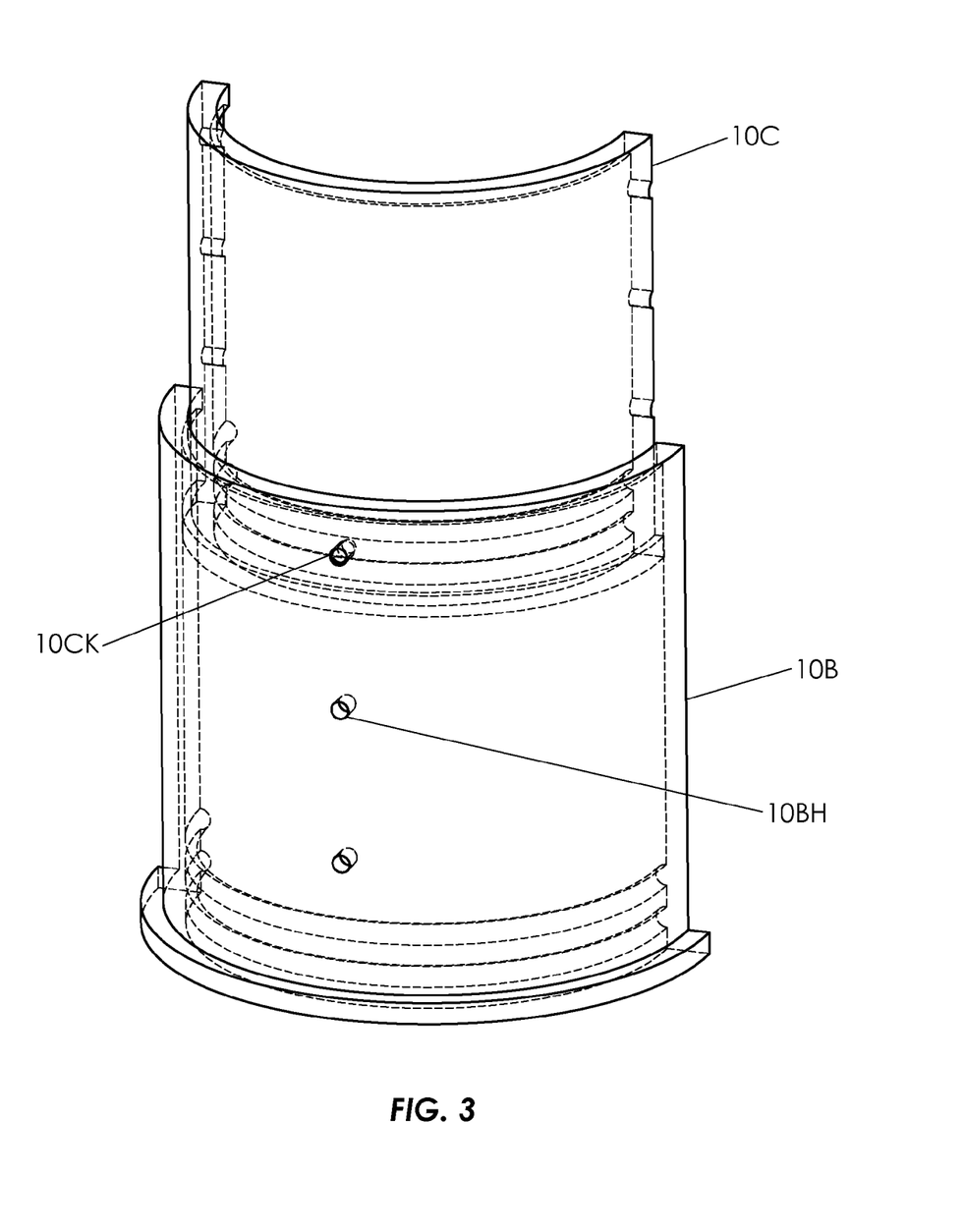
FIG. 3 illustrates a partial sectional view of the embodiment shown on FIG. 1 depicting fasten elements of the inventive device.

The lower intermediate tube 10B may be fastened by the user to the upper intermediate tube 10C, using a conventional type of attachment. In an embodiment, shown on FIG. 3, the tubes 10B and 10C are fastened by providing a number of circular orifices (10BH) vertically situated on the sidewall of tube 10B and a spring-loaded knob (10CK) situated on the sidewall of tube 10C. The user may easily depress the knob 10CK to fasten it in a chosen orifice 10BH, thereby changing an at-rest vertical position of the detecting unit 10, and thus, of the floatable tube 10A. The tubes 10B, 10C, and 10D are also referred to as "non-lowest" tubes. Other embodiments may have only one intermediate tube that can be fasten to the uppermost tube. Yet, some other embodiments may deploy another type of fasten means, such as screw pairs, magnetic, and so on.

The at-rest position of the detecting unit 10 is shown on FIG. 1, and characterized in that the tubes 10A, 10B, and 10C each freely hangs upon the tube disposed above it, being mutually engaged. The engaging is provided by arranging slightly protruded predeterminedly thin brims made on the respective upper and lower edges of the tubes.

The upper intermediate tube 10C in its lower region has a pair of electrically insulated metal sensor rings: an upper ring (16U) and a lower ring (16L) disposed substantially in horizontal planes predeterminedly close to each other, and attached to or built into the sidewall of the tube 10C.

The lower intermediate tube 10B in its lower region has a pair of electrically insulated metal sensor rings: an upper ring (14U) and a lower ring (14L) disposed substantially in horizontal planes predeterminedly close to each other, and attached to or built into the sidewall of the tube 10B. In embodiments including only one intermediate tube, the rings corresponding to the aforesaid rings 16U and 16L, and 14U and 14L can be mounted on that one intermediate tube in its upper region (for 16U and 16L) and in its lower region (for 14U and 14L) respectively. The same principle can be applied in a two-tube level-detecting unit.

The lower floatable tube 10A, preferably in its upper region, has an electrically insulated metal indicator ring (12) disposed substantially in a horizontal plane, and attached to or built into the sidewall of the tube 10A. The ring 12 functions as a position indicator member, indicating the current position of the floatable tube 10A relatively the rings 16U and 16L, and 14U and 14L. The rings 16U and 16L, and 14U and 14L function as sensor members to determine (based on the current position of the indicator ring 12) when the current level of water reaches a predetermined shutoff water level and a predetermined alarm water level respectively. The predetermined alarm water level is generally arranged lower than the predetermined shutoff water level, so that the alarm signal will be issued before the monitor shuts off the incoming water flow. Other embodiments may however provide for the actions to be accomplished simultaneously that need a non-substantial re-design.

The rings 16U and 16L are connected to the circuitry 18C via wires (16W). The rings 14U and 14L are connected to the circuitry 18C via wires (14W). In the embodiment illustrated on FIG. 1, the wires 14W are mounted inside the tubes 10B, 10C, 10D, the spout of unit 18, the housing 18H, and connected to corresponding sockets of the circuitry 18C. The wires 16W are mounted inside the tubes 10C, 10D, the spout of unit 18, the housing 18H, and connected to corresponding sockets of the circuitry 18C. The wires 14W and 16W are performed properly electrically and thermally insulated and waterproof.

In embodiments adopting the opposite tubes diameters relation, the indicator ring, corresponding to the ring 12, will pass inside the sensor rings, corresponding to the rings 14U and 14L or 16U and 16L. In other embodiments, the wires may be mounted outside the tubes, or built (at least partially) in the sidewalls of the tubes. Yet, other embodiments can deploy other various kinds of sensor members and position indicator member: e.g. of the capacitor type (but differently designed), or different type sensors (mechanical, optical, electro-contacting, magnetic, electret-containing, etc.).

Figure 4:
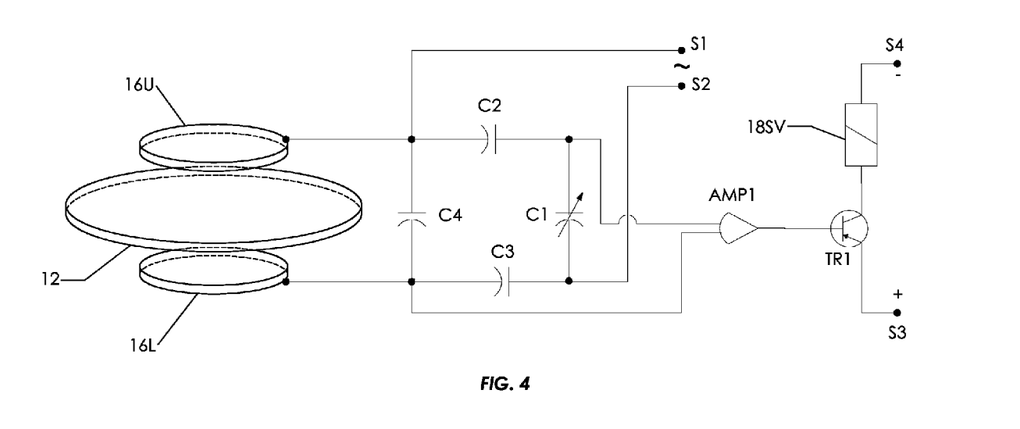
FIG. 4 illustrates a scheme for detection of a shutoff water level and shutting off the incoming water flow, referring to the embodiment shown on FIG. 1.

As illustrated on FIG. 4, the aforesaid control circuitry 18C comprises an electronic generator of sinus-shaped voltage with a predetermined amplitude and frequency (not shown), which voltage is applied to terminals (S1) and (S2). The circuitry 18C comprises a first capacitor bridge including capacitors (C1), (C2), (C3), and (C4), having a feeding diagonal connected to the terminals S1 and S2, and a measuring diagonal connected to an amplifier (AMP1). The capacitor C1 is preferably made variable, i.e. the bridge can be tuned so that the measuring diagonal normally produces a substantially zero measure signal.

An output signal from the amplifier AMP1 is conveyed to a triggering device (TR1) conditionally depicted in FIG. 4 as a transistor (though a more complex conventional scheme can be implemented), connected to DC voltage terminals (S3) and (S4) substantially powered from the batteries of the battery compartment 18B. When the measure signal has a predetermined value substantially differing from zero, the trigger TR1 permits the direct current to flow through the coil of the valve 18SV during a predetermined time, that shuts the valve 18SV, terminating the incoming water flow into the monitor duct 18M. Some embodiments may have a delay time for triggering the trigger TR1 to out-tune from occasional signals.

Figure 5:
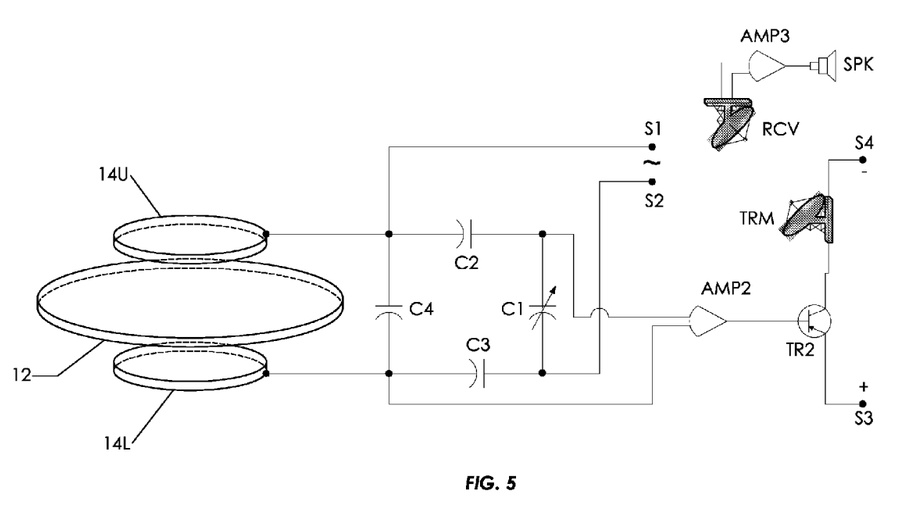
FIG. 5 illustrates a scheme for detection of an alarm water level and warning the user, referring to the embodiment shown on FIG. 1.

As illustrated on FIG. 5, the circuitry 18C comprises the above-described electronic generator of sinus-shaped voltage applied to the terminals S1 and S2 and a second capacitor bridge (substantially similar to the one described above for FIG. 4) including capacitors C1, C2, C3, and C4, having a feeding diagonal connected to the terminals S1 and S2, and a measuring diagonal, connected to an amplifier AMP2, similar to AMP1. The capacitor C1 is preferably made variable, i.e. the bridge can be tuned so that the measuring diagonal normally produces a substantially zero measure signal.

An output signal from the amplifier AMP2 is conveyed to a triggering device (TR2) conditionally depicted in FIG. 5 as a transistor (a similar or another conventional scheme can be utilized), connected to the DC voltage terminals S3 and S4. The circuitry 18 comprises a conventional transmitter (TRM) capable to transmit electromagnetic (radio) waves of suitable frequency and amplitude. The transmitter TRM is connected to the triggering device TR2. When the measure signal has a predetermined value substantially differing from zero, the trigger TR2 permits the direct current to flow from the terminals S3 and S4 feeding the transmitter TRM during a predetermined time, thereby causing it to irradiate a signal carried by the electromagnetic (radio) waves. Some embodiments may have a delay time for triggering the trigger TR2 to out-tune from occasional signals.

A conventional receiver of electromagnetic (radio) waves (RCV) is mounted in a convenient place, preferably outside the bathroom. The receiver RCV is substantially connected to an amplifier (AMP3), which is substantially connected to a speaker (SPK). The receiver RCV is capable to receive the aforesaid signal from the transmitter TRM. The signal is then transformed into an alarm sound produced by the speaker SPK during a preset time.

Other embodiments may deploy a wired design for conveying the signal of the amplifier, similar to AMP2, to a speaker, similar to SPK. Optionally, the speaker can be mounted within the unit 18. In these cases, no transmitter and receiver would be needed. In some embodiments, the alarm may be provided by a light signal (e.g. blinking lights, etc.) instead of or in addition to the sound signal. Yet, some other embodiments may not include the tube 10B, the rings 14U and 14L and the alarm capability at all, deploying only the shutoff portion of the inventive monitor.

In operation, the user chooses the monitor mode by turning the handle 18DH. She fastens the knob LOCK to an orifice selected from the orifices 10BH (shown on FIG. 3), presetting desirable water levels for alarm (preset alarm level) and for shutting off the water (preset shutoff level); opens the faucet 15 providing an incoming water flow into the bathtub 11, sets up a desirable level of incoming water temperature by manipulating conventional hot and cold taps (only one tap of the faucet 15 is shown of FIGS. 1 and 1c). She can leave the faucet 15 open, going somewhere, even leaving the house.

As the bathtub 11 is filled with water, at some point it reaches the preset alarm level, whereupon the floatable tube 10A is lifted so that the ring 12 is positioned in a horizontal plane substantially between the horizontal planes of the ring 14L and of the ring 14U, as shown on FIG. 1a. This changes the impedance of the C4-shoulder of the second capacitor bridge (shown on FIG. 5), so that an electrical signal is produced in the measuring diagonal of the bridge. The signal is further amplified by the amplifier AMP2, triggers the triggering device TR2 that feeds the transmitter TRM with a predetermined direct current sufficient for irradiating an electromagnetic (radio) wave signal. The wave signal is then received by the receiver RCV, amplified by the amplifier AMP3, conveyed to the speaker SPK, which produces an audible alarm sound for a predetermined time. Different conventional ways for alarm reset can be utilized.

If the user has heard the alarm sound, she shuts the incoming water by turning off the faucet 15, and resets the alarm. If the alarm sound has not been heard by the user, the incoming water flow continues entering the bathtub 11, until the water level reaches the preset shutoff level, whereupon the ring 12 is positioned in a horizontal plane substantially between the horizontal planes of the ring 16L and of the ring 16U, as shown on FIG. 1b. This changes the impedance of the C4-shoulder of the first capacitor bridge (shown on FIG. 4), so that a signal is produced in the measuring diagonal of the second bridge. The signal is thereafter amplified by the amplifier AMP1, and further triggers the triggering device TR1 that feeds the coil of valve 18SV with a predetermined direct current sufficient for shutting off the solenoid valve 18SV, and terminating the incoming water flow.

Second Preferred Embodiment: Description and Operation

A second exemplary preferred embodiment of the present invention is illustrated on FIG. 2, FIG. 2a, FIG. 2b, and FIG. 6. Comparing with the first one, the second preferred embodiment has an additional capability to sense and substantially keep the bathtub water temperature at a user pre-set level in a temperature-monitoring mode. The inventive bathtub monitor comprises the input water unit 18 already discussed above and additionally configured for controllable opening at a control means command, and an output water unit (20), as shown on FIG. 2a. In this embodiment, the unit 20 is performed and functions as a regulated drain plug, capable to controllably (depending on the water temperature) outlet the water from the bathtub 11 into a drain hole (11D), situated in the bottom of the bathtub, which drain hole 11D communicates with a conventional water drainage system. Substantially simultaneously, the input water unit 18, inlets new portions of hot water, whereas the unit 20, in cooperation with the unit 18, outlets the cooled water essentially contained in the lower region of the bathtub 11.

Figure 2:
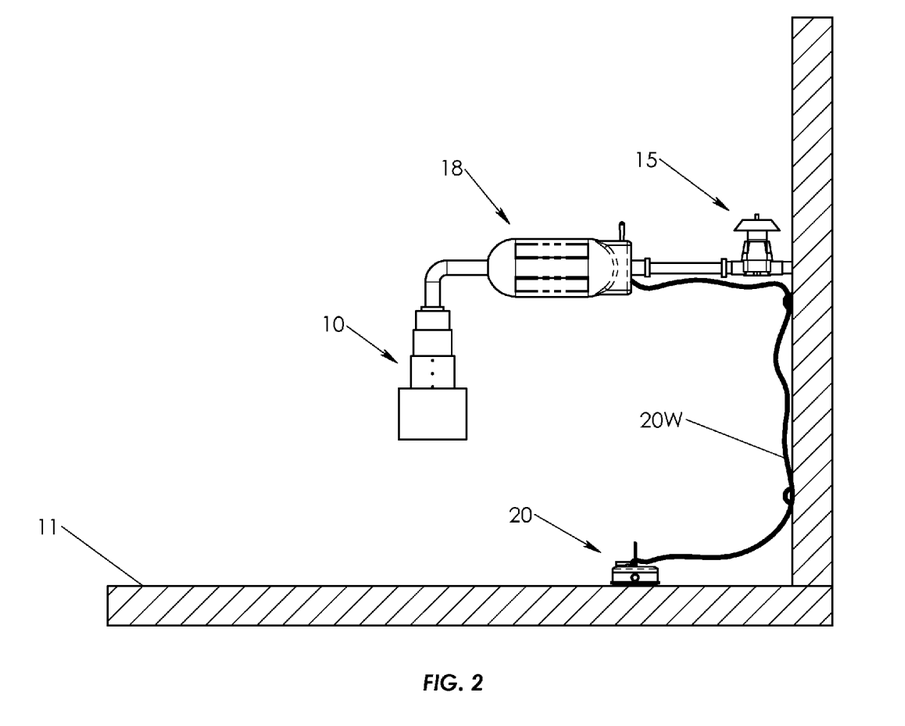
FIG. 2 illustrates an isometric view of another embodiment of the inventive device, including an input water unit and an output water unit.
Figure 2A:
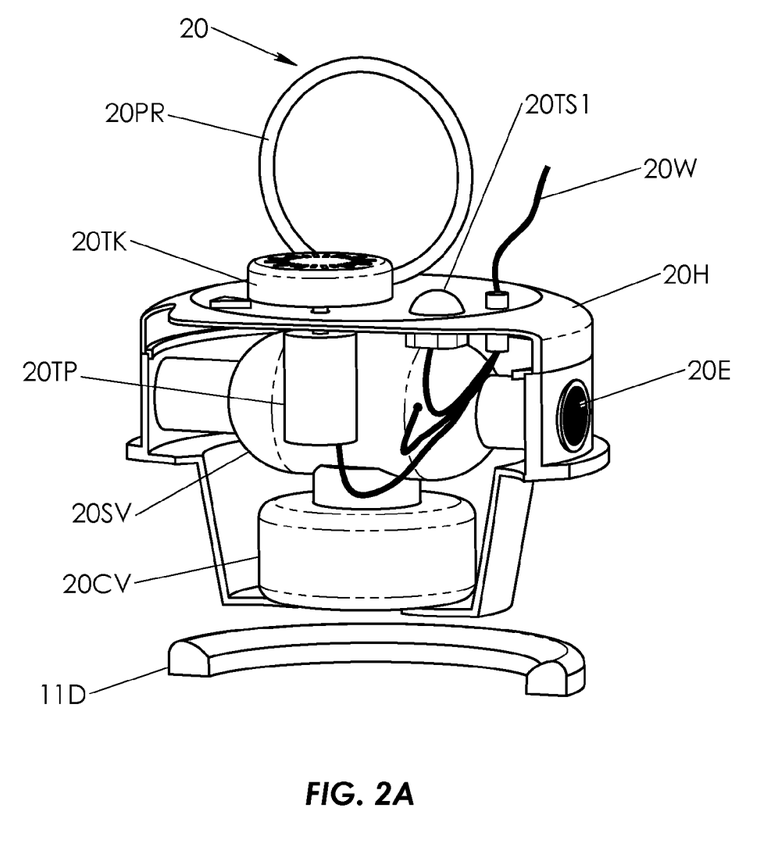
FIG. 2a illustrates a sectional isometric view of the output water unit referring to the embodiment shown on FIG. 2.
Figure 2B:
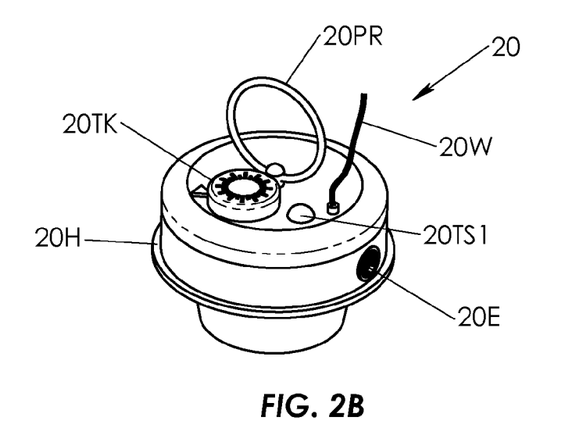

As shown on FIG. 2a, the unit 20 comprises a waterproof housing (20H) of a suitable shape capable to sealingly cover the drain hole 11D. FIG. 2b illustrates the exemplary cylindrical shape of the housing 20H, as viewed from the above. A pullout ring (20PR), shown on FIGS. 2a and 2b, is fixed preferably in the center of the outer upper surface of the housing 20H, allowing the user to manually remove the unit 20, when needed.

The output unit 20 includes a valve (20SV), preferably of a solenoid type. The valve 20SV has two inlet ports (though some embodiments may have only one, or more than two) and one outlet port. The inlet ports, as depicted on FIG. 2a, are connected to water exit channels (20E) extended preferably radially and horizontally, and terminated by openings on the outer surface of the housing 20H, so that communicate with the water body inside the bathtub 11. The outlet port, as depicted on FIG. 2a, is connected to a one-way check-valve (20CV) disposed preferably underneath the valve 20SV, permitting to outlet the water from the bathtub into the drainage system, and preventing the water from the drainage system to enter the bathtub. Some embodiments may include a check-valve incorporated into the solenoid valve. Other embodiments may not include the check-valve.

The water output unit 20 includes a preset temperature selector (20TP), illustrated on FIG. 2a, capable of varying its electric characteristic (e.g. resistance, capacitance, etc.). Thus, a variable resistor or capacitor, or another suitable variable electronic device can be utilized for the temperature selector. The user selects a desirable temperature, which is converted by the selector 20TP into electric voltage of a certain value, and conveyed to the circuitry 18C, as described below. In this embodiment, the temperature selector 20TP is mounted inside the housing 20H.

The user can select a desirable temperature value by turning a preset temperature knob (20TK). The knob 20TK is disposed on the upper surface of the housing 20H and having a temperature scale on it. The preset temperature knob 20TK is mechanically associated with the selector 20TP, enabling the user to vary the aforesaid electric characteristic of the selector. The knob 20TK and selector 20TP must be joined so that preventing water from penetrating into the housing 20H. Some embodiments may utilize other (capacitance-changing, electret-containing, magnetic, optical, etc.) means to transform the turning of the knob 20TK into the changing of the characteristic of the selector 20TP, thereby protecting the housing 20H from penetrating water inside. An arrow-indicator, shown on FIGS. 2a and 2b, is marked on the upper surface of the housing 20H, so that pointing at one of degree numbers marked on the scale and chosen by the user. The numbers on the scale correspond to the temperature values to be selected by the user.

The water output unit 20 includes a first temperature sensor (20TS1) (illustrated on FIGS. 2a, 2b), capable to measure a current temperature of the surrounding water (TS1) in the bathtub by producing an electric voltage value substantially proportional to the current temperature. This measured voltage value is conveyed to the circuit 18C, as described below.

A suitable conventional semiconductor (or another type of) device can be employed for implementation of the sensor 20TS1. The sensor 20TS1 is preferably situated on the outer upper surface of the housing 20H, as shown on FIGS. 2a and 2b. Other embodiments may have the temperature sensor disposed on an outer lateral surface of the housing.

A second temperature sensor (20TS2) (conditionally illustrated on FIG. 6) can be mounted (not shown), for example, inside the monitor duct 18M, measuring a second current temperature (TS2) therein. The temperature TS2 is converted into a substantially proportional voltage value, and conveyed to the circuitry 18C, as described below. Other embodiments might not use the second temperature sensor for simplicity, but it would require additional regulative actions from the user that is discussed further.

Figure 6:
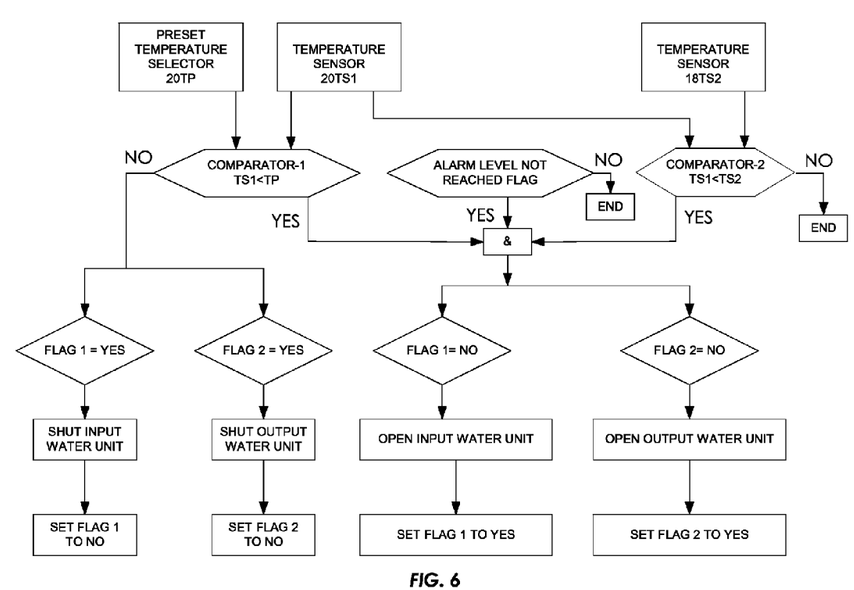
FIG. 6 illustrates a block-diagram for regulation of a desirable bathtub temperature, referring to the embodiment shown on FIG. 2.

In this embodiment, the control circuitry 18C comprises a first Comparator-1, a second Comparator-2, a Boolean module "Alarm Level Not Reached Flag" (ALNRF), an "&" logical module (implementing the condition: only when all inputs are positive, the output is positive), a Boolean module "Flag 1", and a Boolean module "Flag 2" illustrated in the diagram of FIG. 6.

Comparator-1 compares a preset voltage value corresponding to a user selected temperature (TP) of the selector 20TP with a current tub voltage value corresponding to the current temperature in the bathtub TS1.

Comparator-2 compares a current tub voltage value corresponding to the current temperature in the bathtub TS1 with a current monitor voltage value corresponding to the current temperature in the monitor duct TS2.

The ALNRF stores a Boolean value (Yes/No) indicating if the transmitter TRM (see FIG. 5) has not been activated as a result of lifting the floatable tube 10A up to the alarm water level. The Flag 1, Flag 2, and "&" modules perform their conventional functions.

As illustrated on FIG. 2a, the embodiment comprises a wire cable (20W), which incorporates wires for connection of the selector 20TP, the temperature sensor 20TS, and the valve 20SV to the control circuitry 18C and the batteries in the compartment 18B. The connection can be activated in the temperature-monitoring mode, for example, through an additional switch (not shown) mounted on the unit 18. The cable 20W is waterproof and properly electrically and thermally insulated. It can be mounted on the bathroom wall as shown on FIG. 2, or can be placed in a vertical groove made in the wall and properly covered. It also can serve as a cord for the unit 20, similarly to a chain for a common drain plug.

Other embodiments may deploy an output water unit including a battery compartment and a control panel inside the unit, so that it can function independently on the input water unit. Alternatively, the batteries and the control panel may serve the input unit, which would not have those means.

In operation, the user selects a desirable temperature TP by turning the knob 20TK (preferably before the bathtub is filled that provides a better view of the knob) and pointing a selected temperature value on the scale at the arrow-indicator. Then, for example, he falls in sleep, and the water in the bathtub is getting cooler. As shown on FIG. 6, Comparator-1 compares TS1 with TP, if TS1<TP (when the current bathtub temperature drops below the user selected temperature) it issues a positive signal. Comparator-2 compares TS1 with TS2, if TS1<TS2 (the temperature in the monitor duct is higher than the temperature in the bathtub) it issues a positive signal. If the alarm water level has not been reached, the ALNRF issues a positive signal. If the alarm water level is reached and the incoming water flow has not been shut off in the previous cycle (Flag 1=Yes) the unit 18 must not open. In some embodiments, not deploying an alarm means at all, the ALNRF may be substituted by a "Shutoff Level Not Reached Hag" module or another predetermined water level can be defined for this function, which does not essentially alter the temperature regulation comparatively to this preferred embodiment.

As illustrated on FIG. 6, if the "&" module receives all the three positive signals and Flag 1=No and Flag 2=No, it causes the circuitry 18C to issue a command "Open Output Water Unit" that will open the valve 20SV, outletting cooled water from the lower region of the bathtub 11 into the drain hole 11D, and then will also set Flag 1=Yes. With a predetermined delay (or in some embodiments substantially simultaneously), the circuitry 18C will issue a command "Open Input Water Unit" that will open the valve 18SV in letting hot water from the unit 18 into the bathtub 11, and then will also set Flag 2=Yes.

The monitor will continue inletting the hot water until TS=TP, and thereafter the circuitry 18C will issue a command "Shut Input Water Unit", and then also will set Flag 1=No. Then, the circuitry 18C will issue a command "Shut Output Water Unit", and also will set Flag 2=No.

In some simplified embodiments, after an initial filling up the bathtub, the user would switch to the temperature-monitor mode and would have to slightly increase the temperature of hot water by the faucet 15. When the water at the tub bottom is cooled down, it would be automatically replenished by new portions of hot water incoming from the unit 18 into the tub. In such embodiments, the sensor 18TS2 and Comparator-2 are not needed, though the user has to remember to adjust the incoming water temperature after the switching to the temperature-monitor mode. This is not required in the second preferred embodiment described above. More complicated embodiments may include separate regulation for the hot and cold water taps of the faucet 15, which can be routinely redesigned by a person skilled in the art.

The above disclosed design principles, structural and control arrangements of the inventive monitor device might be deployed for regulation of sink faucets, for control of filling various tanks or vessels with different liquids, alarming users when an overflow level is about to be reached, and temperature control for such tanks and vessels.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A bathtub monitor system for monitoring a water level in a bathtub, said system comprising:
    a faucet providing an incoming water flow for said bathtub;
    an input water unit receiving the incoming water flow from said faucet and capable of passing through or shutting off the incoming water flow; and
    a detecting unit capable of detecting said water level, said detecting unit receives the incoming water flow from said input water unit and passes the incoming water flow into said bathtub, said detecting unit including a plurality of telescopically joined tubes slidely disposed relative to each other; said plurality of telescopically joined tubes comprises:
        at least one non-lowest tube including an uppermost tube fixedly joined to said input water unit, said at least one non-lowest tube has sidewalls and is associated with at least one sensor, and
        a lowest tube built floatable, such that said lowest tube is capable of movement relatively to said uppermost tube following the water level, said lowest tube has sidewalls and is associated with a position indicator indicating said water level relatively to said at least one sensor;

wherein:
said at least one sensor is substantially associated with said position indicator; and
said at least one sensor is associated substantially with said input water unit so that capable of causing a shutoff of said input water unit when said water level reaches a predetermined shutoff water level.

2. The bathtub monitor system according to claim 1, further comprising:
an alarm unit substantially associated with said detecting unit so that said alarm unit is capable of producing an alarm signal when the water level reaches a predetermined alarm water level.

3. The bathtub monitor system according to claim 1 wherein:
the system further comprising a control means capable of actuating the shutoff of said water flow in the input water unit, said control means is associated with said at least one sensor;
said control means comprising a first capacitor bridge, including a first measuring diagonal for producing a first measure signal capable to be predeterminedly converted and conveyed to the input water unit to actuate said shutoff;
said position indicator is performed as an electrically insulated indicator ring attached to the sidewalls of the lowest tube, positioned substantially in a horizontal plane;
said at least one non-lowest tube comprising a first non-lowest tube;
said at least one sensor comprising a first sensor, performed as two electrically insulated first sensor rings attached to the sidewalls of said first non-lowest tube; and
said two first sensor rings are positioned substantially in horizontal planes predeterminedly close to each other, and electrically connected to said first measuring diagonal so that producing a first measure signal when the plane of the indicator ring being positioned substantially between the planes of said first sensor rings.

4. The bathtub monitor system according to claim 3, further comprising an alarm means capable of providing an alarm signal for warning users of the system, said alarm means associated with said control means; wherein
said control means further comprising a second capacitor bridge, including a second measuring diagonal for producing a second measure signal capable to be predeterminedly converted and conveyed to the alarm means to actuate the alarm signal;
said at least one non-lowest tube further comprising a second non-lowest tube;
said at least one sensor further comprising a second sensor, performed as two electrically insulated second sensor rings attached to the sidewalls of said second non-lowest tube;
said two second sensor rings are positioned substantially in horizontal planes predeterminedly close to each other, and electrically connected to said second measuring diagonal so that causing the second bridge to produce the second measure signal when the plane of the indicator ring being positioned substantially between the planes of said second sensor rings; and
said detecting unit is configurable for positioning the plane of the indicator ring between the planes of said second sensor rings when the water level reaches a predetermined alarm water level.

5. The bathtub monitor system according to claim 4 wherein:
said first non-lowest tube including a first counterpart fastening means and said second non-lowest tube including a second counterpart fastening means; and
said first counterpart fastening means and said second counterpart fastening means are capable to be manually jointed for configuring said detecting unit.

6. The bathtub monitor system according to claim 1, wherein
said input water unit is further capable of controllable opening the incoming water flow;
the system further comprising:
an output water means for controllable opening and shutting off a drain water flow from said bathtub;
temperature sensor means for measuring at least a current temperature of water within said bathtub, the temperature sensor means are incorporated at least in the output water means;
preset temperature means for enabling a user of the system to select a desirable temperature of water in said bathtub, the preset temperature means are incorporated in the output water means; and
a control means for causing at least said opening and shutting off the incoming water flow, and said opening and shutting off the drain water flow for regulation of said current temperature while permitting said opening the incoming water flow only if the water level being lower than a predetermined water level;
wherein the control means is associated with said input water unit, said output water means, said temperature sensor means, and said preset temperature means.

7. The bathtub monitor system according to claim 6, wherein said predetermined water level being a predetermined alarm water level defined lower than said predetermined shutoff water level;
the system further comprising
an alarm means for warning the users of the system, the alarm means is associated with said control means so that producing an alarm signal when the water level in said bathtub reaches the predetermined alarm water level;
wherein said temperature sensor means including:
a first temperature sensor means for measuring a current water temperature within the bathtub and incorporated in the output water means;
a second temperature sensor means for measuring a current temperature within the incoming water flow and incorporated in the input water unit; and
said control system is capable to compare the current water temperature within the bathtub and the current temperature within the incoming water flow, and to cause said opening of the input water unit and the output water means when the current temperature within the incoming water flow being greater than the current temperature within the bathtub, and when the alarm signal has not been produced.

* * * * *